US012748685B2

(12) United States Patent
Rider

(10) Patent No.: US 12,748,685 B2
(45) Date of Patent: Sep. 29, 2026

(54) SOFTWARE ACCEPTANCE TESTING PLATFORM FOR A COMPUTER SYSTEM CARRYING LIVE NETWORK TRAFFIC IN A TELECOMMUNICATION NETWORK

(71) Applicant: T-Mobile Innovations LLC, Overland Park, KS (US)

(72) Inventor: Jordan S. Rider, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 281 days.

(21) Appl. No.: 18/676,323

(22) Filed: May 28, 2024

(65) Prior Publication Data

US 2025/0370917 A1 Dec. 4, 2025

(51) Int. Cl.
*G06F 11/3668* (2025.01)

(52) U.S. Cl.
CPC ...... *G06F 11/3692* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 2005/0261859 | A1* | 11/2005 | Petsinger | G06F 11/261 702/120 |
| 2009/0006066 | A1* | 1/2009 | Behm | G06F 30/33 703/15 |
| 2010/0131497 | A1* | 5/2010 | Peterson | G06Q 10/06 707/E17.014 |
| 2010/0251024 | A1* | 9/2010 | Gonzales | G06F 11/3698 714/E11.178 |
| 2012/0226465 | A1* | 9/2012 | Mizuno | G06F 11/3684 702/123 |
| 2015/0180950 | A1* | 6/2015 | Hishioka | G06F 11/3688 702/108 |
| 2016/0117239 | A1* | 4/2016 | Hamilton, II | G06F 11/3684 717/124 |
| 2017/0010959 | A1* | 1/2017 | Smith | G06F 11/3688 |
| 2017/0083432 | A1* | 3/2017 | Dhulipala | G06F 11/3684 |
| 2017/0161180 | A1* | 6/2017 | Raghavan | G06F 11/3684 |
| 2018/0217921 | A1* | 8/2018 | Palyekar | G06F 11/3688 |
| 2019/0087311 | A1* | 3/2019 | Donaldson | G06F 11/3684 |
| 2019/0377736 | A1* | 12/2019 | Balasubramanian | G06F 11/3692 |

(Continued)

*Primary Examiner* — Qing Chen

(57) ABSTRACT

A method of testing software executing on computer systems. The method comprises executing a plurality of test instructions associated with a test job by a testing application on the computer system on which the software executes; capturing information about a container associated with the software by the testing application, wherein the information comprises a memory allocation associated with the container, a memory consumed by the container, a central processing unit (CPU) utilization allocation, a CPU allocation consumed, an internet protocol (IP) addresses assigned to the container; determining a score by a test validation application based on the information about the container, on test results, and on a scoring policy defined by a test case suite, wherein the scoring policy defines scoring based in part on a type of the container; based on the scores, and taking action by the action engine in the computer system on which the software executes.

20 Claims, 11 Drawing Sheets

(56) References Cited

U.S. PATENT DOCUMENTS

| | | | | |
|---|---|---|---|---|
| 2021/0263842 | A1* | 8/2021 | Sekhar | G06N 20/00 |
| 2021/0303450 | A1* | 9/2021 | Bhat | G06N 3/0464 |
| 2022/0179777 | A1* | 6/2022 | Bhat | G06F 11/3688 |

* cited by examiner

SOFTWARE ACCEPTANCE TESTING PLATFORM FOR A COMPUTER SYSTEM CARRYING LIVE NETWORK TRAFFIC IN A TELECOMMUNICATION NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern systems commonly have software embedded in them to provide intelligence and complex decision making at high speeds. Communication systems comprise a complex fabric of cooperating computer systems executing complex software. To assure that new and/or modified software is clean and ready for deployment into live systems, the software desirably is tested at different levels of granularity. Software testing itself is a complex and time-consuming activity.

SUMMARY

In an embodiment, a method of testing production software executing on computer systems carrying live telecommunication traffic is disclosed. The method comprises receiving a command to run a test suite by a job manager application executing on a computer system, wherein the command comprises an identity of the test suite; retrieving a test template by the job manager application from a data store based on the identity of the test suite; identifying a dispatch application instance executing on a computer system by the job manager application, wherein the dispatch application instance is associated with the computer systems on which the production software executes; and creating a test job by filling out the test template with configuration information by the job manager application based on the computer systems on which the production software executes. The method further comprises sending the test job to the dispatch application instance by the job manager application; receiving a query by the dispatch application instance from a testing application executing on the computer systems on which the production software executes, where the query asks if a test job is pending; in response to receiving the query, sending a link to the test job by the dispatch application instance to the testing application; and sending a request for test instructions by the testing application to a command storage and authorization (CSA) application executing on a computer system, wherein the request for test instructions comprises the link to the test job and a secure signature associated with the testing application. The method further comprises validating the secure signature by the CSA application; validating by the CSA application that the testing application is qualified to execute the test job; and sending executable test instructions by the CSA application to the testing application. The method further comprises calculating a checksum value by the testing application over the executable test instructions; comparing the calculated checksum value by the testing application to a canonical checksum value defined for the executable test instructions; executing the test instructions by the testing application on the computer system on which the production software executes; capturing information about a container associated with the production software; and capturing test results. The method further comprises sending the information about the container and the test results by the testing application to the dispatch application instance; sending the information about the container and the test results by the dispatch application instance to a test validation application executing on a computer system; determining a test case score by the test validation application based on the information about the container, on the test results, and on a test scoring policy defined by the test case suite; providing the test case score by the test validation application to an action engine; and, based on the test case scores, taking action by the action engine in the computer system on which the production software executes.

In another embodiment, a method of testing production software executing on computer systems carrying live telecommunication traffic is disclosed. The method comprises generating a command to run a test suite periodically by a scheduler application executing on a computer system; receiving the command to run a test suite by a job manager application executing on a computer system, wherein the command comprises an identity of the test suite; creating a test job by the job manager application; and sending the test job to a dispatch application instance executing on a computer system by the job manager application. The method further comprises receiving a query by the dispatch application instance from a testing application executing on the computer systems on which the production software executes, where the query asks if a test job is pending; in response to receiving the query, sending a link to the test job by the dispatch application instance to the testing application; and sending a request for test instructions by the testing application to a command storage and authorization (CSA) application executing on a computer system, wherein the request for test instructions comprises the link to the test job and a secure signature associated with the testing application. The method further comprises sending executable test instructions by the CSA application to the testing application; executing the test instructions by the testing application on the computer system on which the production software executes; capturing information about a container associated with the production software; and capturing test results. The method further comprises sending the information about the container and the test results by the testing application to the dispatch application instance; sending the information about the container and the test results by the dispatch application instance to a test validation application executing on a computer system; and determining a test case score by the test validation application based on the information about the container, on the test results, and on a test scoring policy defined by the test case suite. The method further comprises providing the test case score by the test validation application to an action engine; and, based on the test case scores, periodically presenting updated reports on the computer systems carrying live communication traffic by a network operations center (NOC) dashboard.

In yet another embodiment, a method of testing production software executing on computer systems carrying live telecommunication traffic is disclosed. The method comprises receiving a command to run a test suite by a job manager application executing on a computer system, wherein the command comprises an identity of the test suite; creating a test job by filling out the test template with configuration information by the job manager; sending the test job to a dispatch application instance by the job manager application; and receiving a query by the dispatch application instance from a testing application executing on the computer systems on which the production software executes, where the query asks if a test job is pending. The method further comprises, in response to receiving the query, sending a link to the test job by the dispatch application instance to the testing application; executing a plurality of test instructions associated with the test job by the testing application on the computer system on which the production software executes; capturing information about a container associated with the production software by the testing application, wherein the information comprises a memory allocation associated with the container, a memory consumed by the container, a central processing unit (CPU) utilization allocation, a CPU allocation consumed, an internet protocol (IP) addresses assigned to the container; and capturing test results by the testing application. The method further comprises sending the information about the container and the test results by the testing application to the dispatch application instance; sending the information about the container and the test results by the dispatch application instance to a test validation application executing on a computer system; and determining a test case score by the test validation application based on the information about the container, on the test results, and on a test scoring policy defined by the test case suite, wherein the test scoring policy defines scoring based in part on a type of the container. The method further comprises providing the test case score by the test validation application to an action engine; and, based on the test case scores, taking action by the action engine in the computer system on which the production software executes.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
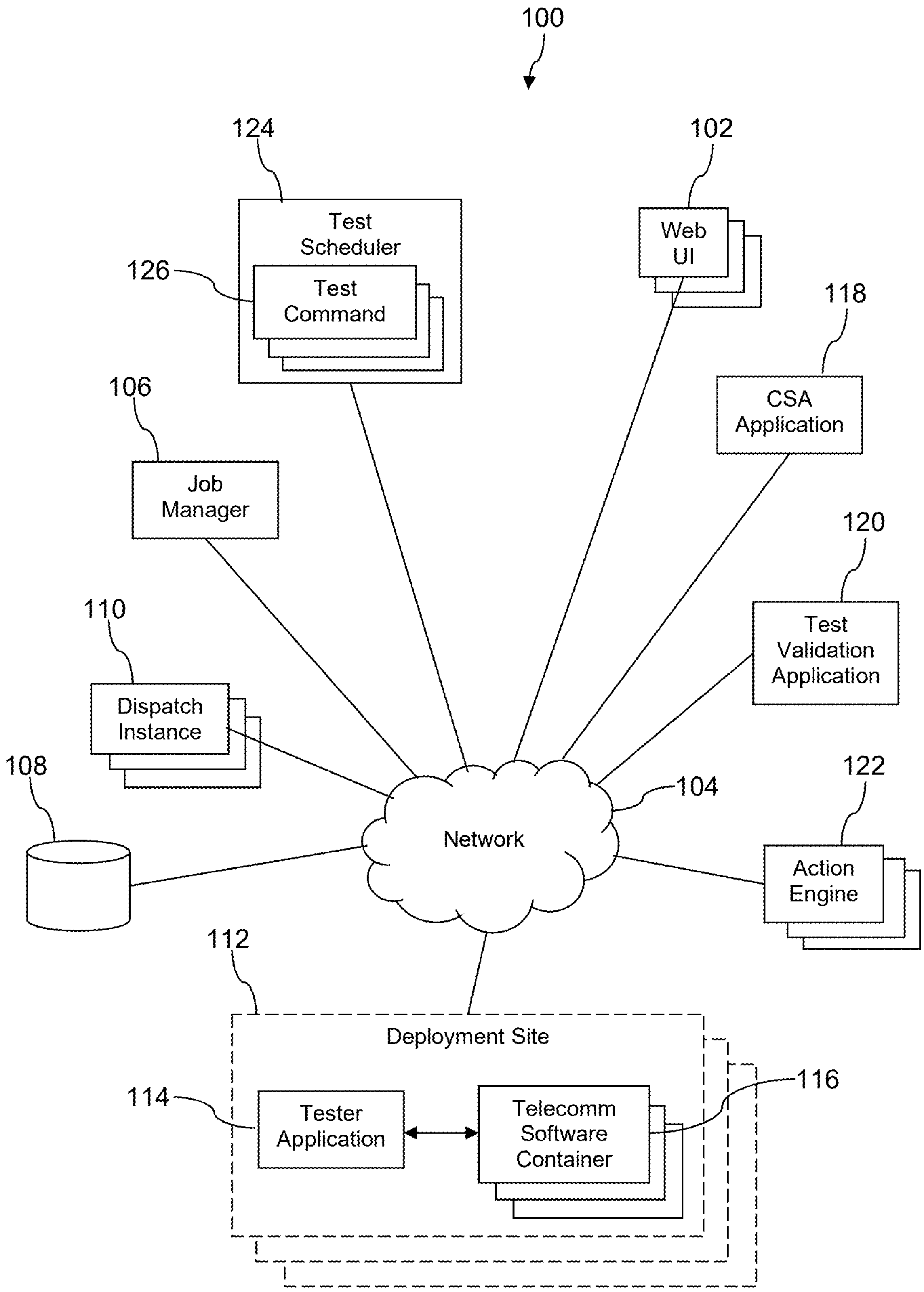
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Testing software and complex computer systems executing software is a complex and time-consuming process. Testing desirably is performed at different stages in the lifecycle of software and computer systems. Traditionally, testing is conducted at a unit test level, at a system test level, and at an integration test level (all components of the system interacting). Testing of already deployed software-testing software in a production environment—is typically not done, because this is considered risky and has the potential to cause unpredictable disturbances of mission critical business facilities. For a telecommunication service provider, for example, testing in the production environment could potentially cause service outages for service customers, and service outages are very much to be avoided to keep customers happy and to avoid challenges from public communication infrastructure oversight agencies, for example from the Federal Communications Commission (FCC).

The present disclosure teaches a system that supports acceptance testing and production testing. Acceptance testing is similar to what is referred to above as integration testing, with the exception that acceptance testing may execute a larger number of test cases. Said in other words, in an embodiment, integration testing may be conducted by executing a selected subset of the totality of acceptance testing test cases. The system can be considered to be a framework or platform for testing software and systems both in an acceptance test environment and a production test environment. In an embodiment, the system is designed in a modular way to promote ease of maintenance and to future-proof the system. More particularly, the modular design supports ease of changing underlying vendor computer processing applications such as virtualization applications, messaging middleware applications, database management applications, and/or server hardware vendors. In the disclosed system, changes to the modular system resulting from changes of an underlying infrastructure application can be isolated to a single module of the system and not cascade into changes in other modules.

In an embodiment, the system comprises a job manager that receives requests to execute tests and creates an associated test job based on each request. The job manager identifies a dispatch application instance that is suitable and sends the test job to the selected dispatch application instance. The dispatch application instance may be associated with a particular deployment site. A deployment site may comprise a plurality of computers executing a variety of enterprise software applications. The deployment site can be an integration testing environment. Alternatively, the deployment site may be a production environment. In a telecommunication service provider environment, the deployment site may comprise computer systems executing software containers that implement virtual network functions (VNFs), for example supporting a 5G core network. To support the testing framework described herein, the deployment site may have a testing application installed on one or more computers and configuration files defining testing information such as secure certificates and keys. The testing application checks in with the dispatch application instance from time to time to see if a test job is pending for it to execute.

In an embodiment, when the testing application learns that a testing job is pending, it receives the test job and sends a request to a command, storage, and authorization (CSA) application that executes on a computer system outside of the deployment site. In an embodiment, the test job does not define test execution instructions but instead provides a reference to such instructions. The request the testing application sends to the CSA application may comprise a secure certificate and one or more secure tokens. The CSA application validates the secure certificate and any secure tokens. The CSA application determines if the given deployment site and/or testing application is qualified to execute the type of test job indicated in the request. If all checks out, the CSA application uses the identification of a test suite or test case provided in the request to fetch associated test instructions from a data store. The CSA application returns the test instructions to the testing application.

In an embodiment, test cases may be flagged or otherwise designated as being able to run in production environments or unable to be run in production environments. A test case that is unable to be run in a production environment may be referred to in some contexts as a disruptive test case, in that it may interfere with proper handling of live network traffic. In addition, test suites may be created as being suitable for executing in a production environments or unsuitable for executing in a production environment. The test cases able to run in production environments are those that do not disrupt handling of live traffic in the production environment. For example, these test cases may be deemed monitoring test cases that capture CPU utilization metrics, memory utilization metrics, and key performance indicators (KPIs) of the live traffic. The system checks the proposed test execution computer(s) to determine if it is carrying live traffic or not, and it if is carrying live traffic that the test suites are those deemed to be suitable for executing in a production environment. This may be done by checking an enterprise system that tracks the status of computers that indicate whether the computer or node is in a new state, a maintenance state, or an in-service state. If an attempt is made to run a test suite that is unsuitable for executing in a production environment on a node that is indicated as being in an in-service state, an error will be generated and the disruptive test suite will not be executed on the in-service computer.

In an embodiment, the first set of test cases in each test suite performs a kind of “pre-flight” check of the computer the test suite is executed on. These initial test cases determine a baseline of the computer executing the test suite. One of the checks done on by the initial test cases is to determine a number of subscribers registered to the computer which is executing the test cases. If there are subscribers registered to the computer that is executing the test cases and the given computer was indicated to NOT be in-service, the system would raise an error and abort further testing on the given computer. This may be considered to be a back-up to checking the status of the given computer system. In this way testing can be performed on live computers or network nodes without endangering the reliable handling of live traffic.

In an embodiment, the testing application calculates a checksum value over the test instructions received from the CSA application and compares to a canonical checksum value provided in the test job it received from the dispatch application instance. If the checksum that the testing application calculated matches the canonical checksum, the testing application executes the test instructions. It is noted that the communication between the testing application and the CSA application provides multiple authentication and security checks that can reduce the risk of hacker intrusions into the testing activity which otherwise could provide a security vulnerability, particularly when the deployment site is a production system carrying live telecommunication traffic or is performing other mission critical processing of an enterprise. In an embodiment, the communication between the dispatch application instance and the testing application is conducted over a secure channel, for example via a secure web socket, via a virtual private network (VPN) connection, via a secure HTTP communication link, or via another secured communication link.

The testing application collects test results related to the outputs or end states of the processing of the software on the computers of the deployment site. These are the traditional testing results—test inputs are provided to a system and the outputs or end states are captured. The testing application also collects information about the software containers that are executing on the computers of the deployment site. This information may comprise software versions, operating system versions, CPU resources, memory resources, and network resources allocated to the container or containers as well as actual resources consumed by the container or containers. Utilized CPU resources may comprise a CPU percentage utilization and/or a CPU percentage idle time. Utilized memory resources may comprise memory actually used versus memory reserved or set aside for use. Network resources may comprise identification of internet protocol (IP) addresses assigned within the deployment site. Collecting information on the container or containers associated with the test can support evaluating the health and/or robustness of the execution environment not just the success/fail of the software.

The testing application returns the test results to the dispatch application instance, and the dispatch application instance forwards these results to a test validation application. The test validation application scores the completed test based on the traditional test results, based on the information collected about the containers, and based on scoring criteria that are defined for and attached to the test suite. The scoring criteria may be defined by test engineers during formulation and creation of test cases and/or test suites. The scoring criteria can be defined differently for different container types.

In an embodiment, the test validation application sends the test score or a test pass/fail indication to one or more action engines. The test validation application may send other information to the action engines also, for example key performance indicators (KPIs) collected from the subject deployment site. The action engines are responsible for taking some sort of action based on the test score and/or KPIs. In an embodiment, a first action engine may be an alarm action engine that may be responsible for updating alarms at a network operations center (NOC) dashboard or alarming system within a telecommunication service provider system. In an embodiment, a second action engine may be a view action engine that is responsible for updating operational state information, for example for display on a NOC dashboard. In an embodiment, a third action engine may be a performance engine that stores KPI data in a data store. In an embodiment, the performance engine may adapt and/or process received KPI data in some way, for example generating averages or other statistical representations of KPI data. It will be appreciated that the test validation application may send test results to the alarm action engine, to the view engine, and/or to the performance engine only when the subject deployment site is a production environment and may not sent test results when the deployment site is an integration test environment.

In an embodiment, a fourth action engine may be a step engine that takes corrective steps based on test results. The action engine may collect log information from the associated deployment site, store this log information in an archive, and then delete the log information from the deployment site, whereby to cleanup the logs at the conclusion of a test. The step engine may perform one or more level or restarts: restart a communication stack, restart IP stack, restart communication links, and/or restart a container. The action engine may determine a likely cause of a test failure, take automated action to correct the test failure, and then requeue the test to run again, this time with an increased likelihood of success. Such failures can occur because of bad IP addresses being configured or a resource within the deployment site being down temporarily. Enabling the step engine to remediate such common problems can streamline and accelerate the testing process.

In an embodiment, a web site user interface (UI) may provide a means for launching tests by the system by sending commands to the job manager application. In an embodiment, the system provides a test scheduler application that allows defining times for specific tests to be executed on the system. These scheduled tests may be scheduled to execute at desirable times, for example during periods of low system utilization or low telecommunication network utilization, whereby to minimize impacts. These scheduled tests may be scheduled to occur periodically, for example every five minutes or every ten minutes. For example, different test cases may be defined to establish current network operational parameters and push each of these determined parameters up to the NOC dashboard for updating. Just as an example, a first periodic scheduled test may be scheduled every five minutes that determines CPU status of production environment computers and pushes this information up to the NOC dashboard for presentation; and a second periodic scheduled test may be scheduled every ten minutes that determines network switch status of production environment and pushes this information up to the NOC dashboard for presentation. The test scheduler application may send test commands to the job manager application much as the web site UI sends commands to launch tests to the job manager application. It is understood that the system may support concurrent testing based on multiple different test commands.

In an embodiment, the functionality to define periodically repeating tests can be used to provide alarm notifications on events that are not supported by vendors of telecommunication equipment or of other types of electronic equipment. The failure of such a test can be linked to an action that generates an alarm that then propagates to the NOC and is presented on the NOC dashboard.

Turning now to FIG. 1, a system 100 is described. In an embodiment, the system 100 comprises a web user interface (UI) 102, a network 104, a job manager 106, a data store 108, a dispatch instance 110, and a deployment site 112. The network 104 comprises one or more public networks, one or more private networks, or a combination thereof. The system 100 may comprise a plurality of web UIs 102, for example a different web UI instance each executing on a different workstation. The system 100 may comprise a plurality of different deployment sites 112. The system 100 may comprise a plurality of dispatch application instances 110. In an embodiment, each dispatch application instance 110 may execute on a computer in a different deployment site. In an embodiment, each dispatch application instance 110 executes on a computer system that is outside of the deployment sites 112.

Each deployment site 112 may contain 20 or more server computers. In some contexts, the server computers at a deployment site 112 may be referred to as a 'pod.' Each deployment site 112 may comprise one or more server computers executing a third-party containerization system, for example supporting Kubernetes. Each deployment site comprises a tester application 114 and one or more software containers 116. In an embodiment, the software containers 116 are telecommunication-related software containers 116, for example containers that implement a virtual network function (VNF), but is understood that in other embodiments the software containers 116 may encapsulate different enterprise applications that are not associated with telecommunication network operations. In an embodiment, the software containers 116 may comprise call server containers (e.g., containers encapsulating a telephony application server or TAS), packet server containers (e.g., containers encapsulating an application supporting packetized data communication), communication session containers, communication signaling containers, virtual load balancing containers, and other types of containers.

Some of the deployment sites 112 may be established in a segregated environment established for running tests, for example, system tests, integration tests, or acceptance tests. These deployment sites 112 may be configured so they are isolated from at least portions of the network 104 and may be considered to be a "walled garden" environment or a "testing" environment. Some of the deployment sites 112, by contrast, may be configured to carry live traffic in a telecommunication network, for example may be part of the network 104 or may be configured to perform mission critical functions for an enterprise information processing system. This later kind of environment may be considered to be a "production" environment.

The system 100 further comprises a command, storage, and authorization (CSA) application 118, a test validation application 120, and one or more action engines 122. In an embodiment, the system 100 further comprises a test scheduler 124 that executes one or more test commands 126. The job manager 106, the CSA application 118, the test validation application 120, the action engines 122, and the test scheduler 124 execute on one or more computer systems. In an embodiment, all of the components of system 100, with the possible exception of the network 104, are within the private domain of a telecommunication service provider or within the private domain of an enterprise. Computer systems are described further herein after. In an embodiment, the system 100 may be disposed within the domain of an enterprise such as a major corporation. In an embodiment, the system 100 may be disposed partly within the domain of an enterprise and partly outside the domain of the enterprise (e.g., part of the system, possibly the deployment sites 112, may be deployed in a third-party cloud computing environment).

During a test, a tester may use the web UI 102 to launch a test case or a test suite. The command may pass from the web UI 102 to an application programming interface (API) and then to the job manager 106. The job manager 106 may retrieve information about the identified test case from the data store 108, for example retrieving a test template. The test template may provide the skeleton or schema of a test case or test suite. The job manager 106 may populate the test template with relevant details. For example, variables in test case and/or test templates can be mapped by the job manager 106 to site specific values, for example, the job manager 106 can fill the test template with site specific IP addresses (e.g., when running a test to validate IP address configuration which might differ from site to site). Another example would be site specific configurations, such as on site "X" there may be 50 software containers running a telecommunication application, but on site "Y" there are 48 software containers running, in which case the job manager 106 can adjust test cases accordingly. The job manager 106 then identifies a suitable dispatch application instance 110 and sends the test case or test suite to the selected dispatch application instance 110.

The tester application 114 at a deployment site 112 periodically polls a dispatch application instance 110 if a test case or test suite is available for execution. The tester application 114 may communicate with the dispatch application instance 110 via a secure hypertext transfer protocol (HTTP) communication link. In an embodiment, the tester application 114 may comprise a tester connect component and a tester client component. In an embodiment, the tester application 114 may communicate with the dispatch application instance 110 via a secure web socket. When there is a test case or test suite available, the tester application 114 retrieves the test case or test suite. In an embodiment, the test case or test suite that the tester application 114 retrieves from the data store 108 does not include the full set of executable instructions but instead identifiers of such instructions.

In an embodiment, the tester application 114 sends an identification of the test case or test suite to the CSA application 118. The CSA application 118 may perform one or more steps to secure and/or authorize the tester application 114. For example, the CSA application 118 may access the data store 108 to retrieve test instructions. The CSA application 118 may validate a certificate or authentication token provided by the tester application 114. The CSA application 118 may check if the tester application 114 and/or the deployment site 112 is qualified to execute the subject test instructions. If everything checks out, the CSA returns one or more test instructions to the tester application 114. The test instruction can request information about container CPU allocation and use, memory allocation and use, hard disk space, timer values (e.g., 3GPP timers), container configuration parameters, IP addresses, and other information. Other examples of test instructions may be: display active alarms in local virtual network function (VNF) storage, display call detail record (CDR) logger configuration, display configured established port connections, display configured representational state transfer (REST) configuration, display configured software version, display VNF door bell configuration, display fully qualified domain name (FQDN) of a centralized analytics server (CAS) node (e.g., a vendor specific node in some virtual network function deployments), display IP address configuration, display IP interface configuration, display network configuration session statistics, display network configuration stream information, display CAS overload settings, display system overload status and overload timers, display CAS platform monitor configuration, display HTTP service port information, display VNF FQDN information, display CAS VNF status, and display Cloud Range Data Layer (CRDL) information. (CRDL is a vendor specific implementation of CouchDB-a no-SQL database which may be used in some applications which store subscriber related data and session information.)

The tester application 114 receives the test instructions from the CSA application 118 and calculates a checksum over the test instructions. The tester application 114 compares the checksum it calculates against a canonical checksum value received from the dispatch application instance 110, for example stored in the test case and/or test suite information it received from the dispatch application instance 110. If the calculated checksum value does not match the canonical checksum value, this implies that the test instructions that the tester application 114 received from the CSA application 118 are either randomly corrupted by a communication glitch or possibly by a cyberattack. The tester application 114 does not execute the test instructions if the two checksum values do not match. If the two checksum values match, the tester application 114 executes the test instructions and captures the results of executing the test. The tester application 114 also captures information about the execution environment of the test instructions, for example information about the container that executed the test instructions. The information about the container execution environment may be CPU allocation, CPU utilization, memory allocation, memory utilization, disk space allocation, disk space utilization, network addresses, IP addresses, and other information.

The tester application 114 sends the results of executing the test instructions (e.g., the test results, the results from executing the test case or test suite) and the information captured about the container to the dispatch application instance 110. The dispatch application instance 110 then sends the test results and information captured about the container where the test instructions executed to the test validation application 120. The test validation application 120 scores the results of the testing and the captured information about the container based on a test scoring policy. The test scoring policy may be defined in the test case or test suite, for example in a file included in the test case or test suite. In an embodiment, the test scoring policy is contained in a JavaScript Object Notation (JSON) formatted file or another kind of file. The test validation application 120 can determine a pass or fail status of the test case or test suite. In an embodiment, the test validation application 120 can generate key performance indications (KPIs) based on the test results and captured information on the containers. Alternatively, the test validation application 120 may send the test result information and captured information on containers to another application, for example to a KPI-related action engine 122, and this other application may generate the KPI values. In either case, the KPI values may be stored in the data store 108.

The test validation application 120 may send information about scoring and/or test results to one or more of the action engines 122. For example, if a test case fails, the test validation application 120 may send these results to an alarming action engine 122 (e.g., an action engine 122 that generates alarms that are presented on a NOC of the system 100). The test validation application 120 may send these results to a view monitor action engine 122 that presents test results in a display of the web UI 102.

The test validation application 120 may send the test results to an action engine 122 that takes steps to repair or clean up after a test. This may be referred to as the action engine 122 taking corrective action in some contexts. For example, a step action engine may copy log files at the deployment site 112 that were generated during execution of a test case and/or of a test suite, store the copied log files to archive, and then delete the log files from the deployment site 112. For example, a step action engine may perform a restart operation—restart a communication protocol stack such as restart an IP stack, restart communication links, restart a container, and then restart the test case and/or test suite. For example, a step action engine may change the configuration of a container and restart the test case and/or test suite. In an embodiment, the step action engine may change the configuration of a container by increasing or decreasing a memory space allocation, by increasing or decreasing a CPU allocation, by increasing or decreasing a hard disk storage allocation. Using some of these features, the step action engine can audit telecommunication configurations on the node under test and, if a parameter stored in the telecommunication application's database (e.g., a 3GPP timer) is incorrect, the step engine can change it to the correct value. For example, if IP addresses are incorrectly set on the telecommunication application, the system can use the step action engine to change these to correct IP addresses.

In an embodiment, the test scheduler 124 may be configured to periodically execute a test case or test suite, for example from the web UI 102. A test case or test suite may be scheduled to execute every minute, every five minutes, every ten minutes, every fifteen minutes, every twenty minutes, every thirty minutes, every hour, twice per day, once per day, once per week, or on some other periodic interval. In some circumstances, a test case or test suite may be designed to act as a diagnostic check and alarming feature. Vendor equipment may support specific alarms on the equipment and flow alarm reports up to a monitoring system, for example to a NOC. But an operator of a telecommunication network or other enterprise may desire to have some alarm conditions reported that are not in fact reported on by the off-the-shelf vendor equipment. Thus, the system 100 supports adding test cases and/or test suites that, in effect, add monitoring and reporting on alarm conditions that are not natively supported by vendor equipment. Such test cases and/or test suites may be said to provide a custom alarm notification function, since they are able to provide an alarm notification function for equipment conditions for which vendors have not provided alarms. For example, a test case and/or test suite can be defined and scheduled via the test scheduler 124 for periodic execution that checks on server fans. For example, a test case and/or test suite can be defined and scheduled via the test scheduler 124 for periodic execution that checks on server rack power supplies. The test commands 126 may define a periodic interval or time and identify a test case and/or test suite that is to be launched by the job manager 106 as described above. In an embodiment, the test command 126 may be created ad hoc in association with troubleshooting a specific problem in the network 104 and/or the deployment site 112. When the specific problem has been resolved, the associated test command 126 may be deleted from the test scheduler 124.

Figure 2A:
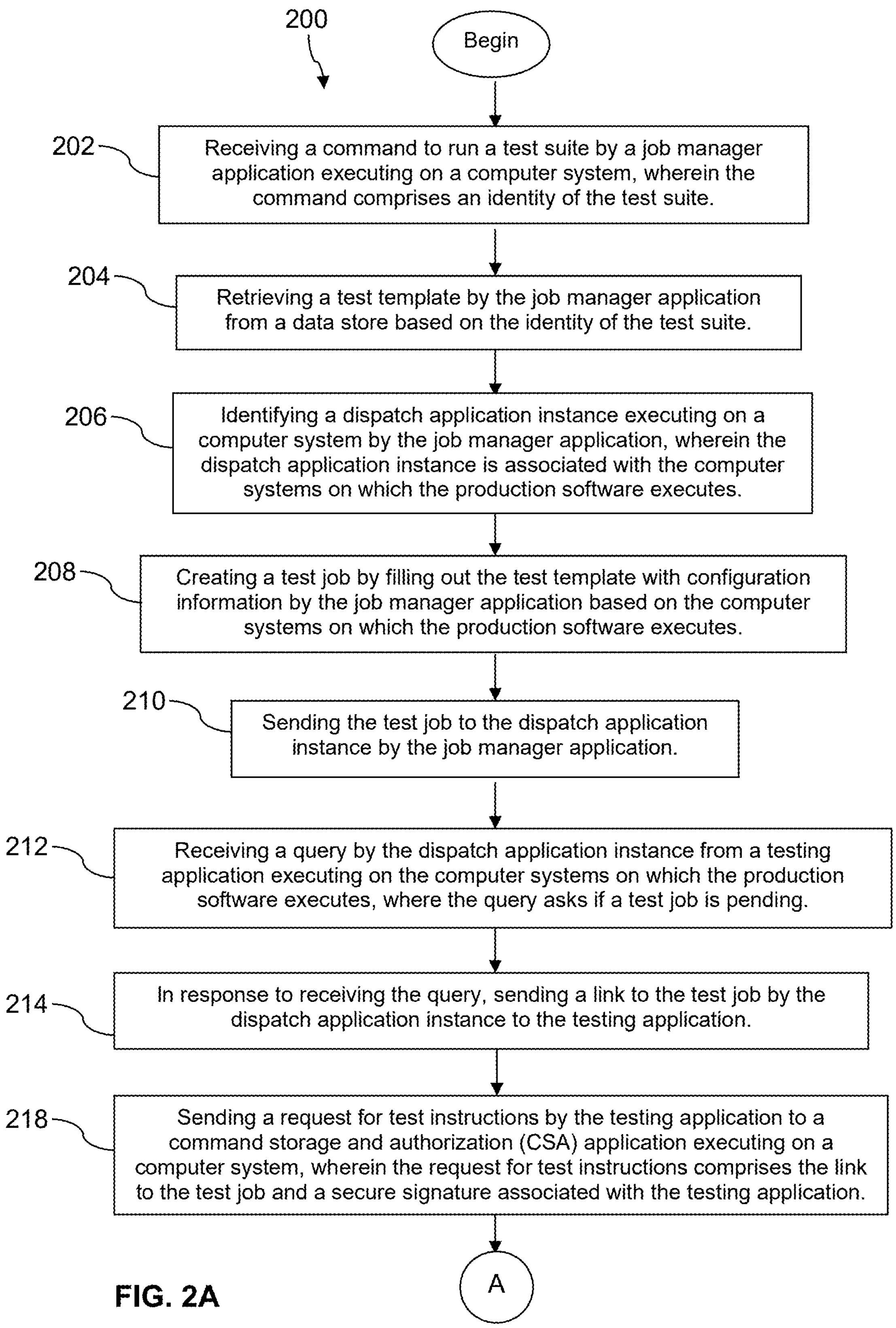
FIG. 2A, FIG. 2B, and FIG. 2C are a flow chart of a method according to an embodiment of the disclosure.
Figure 2B:
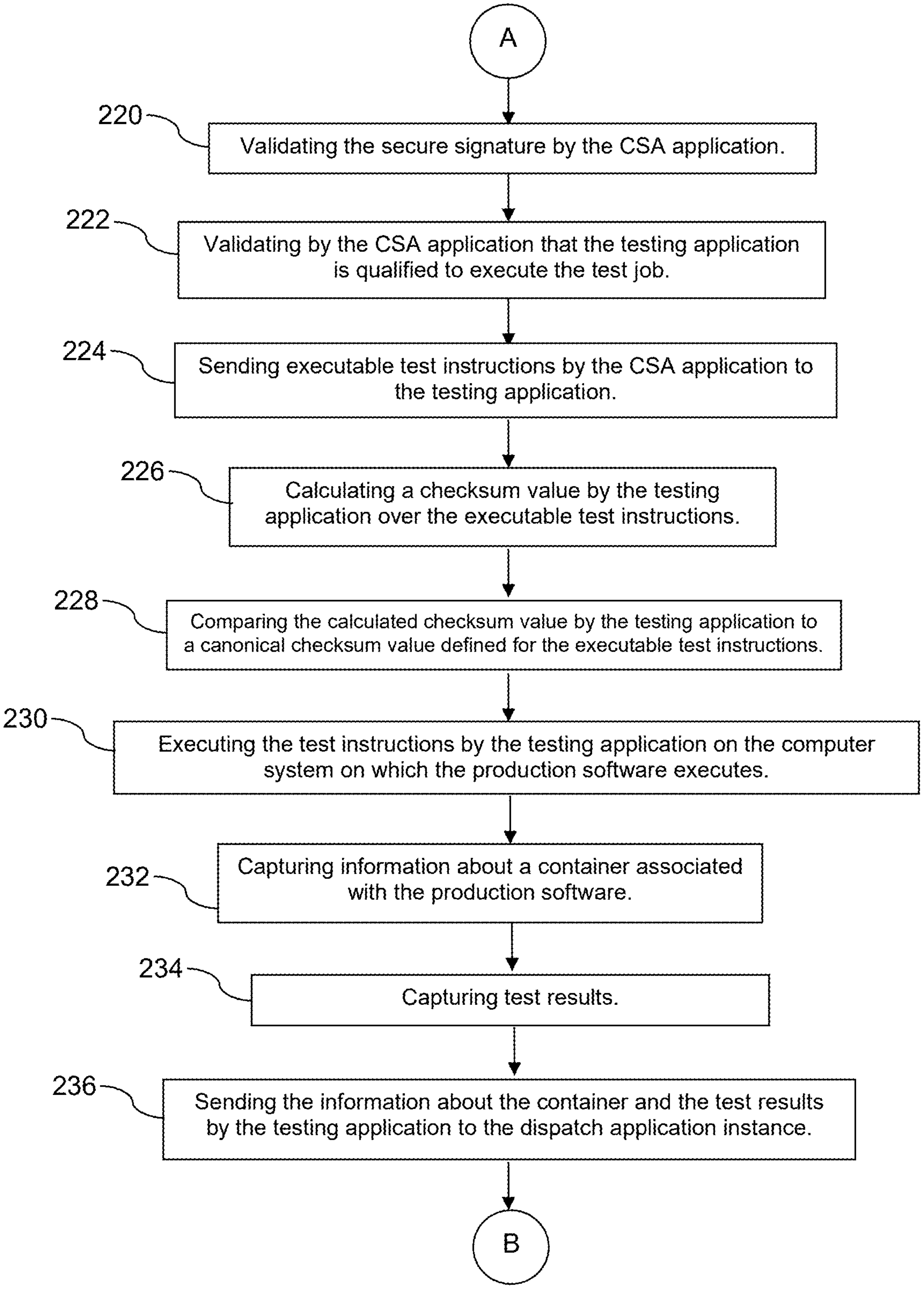
Figure 2C:
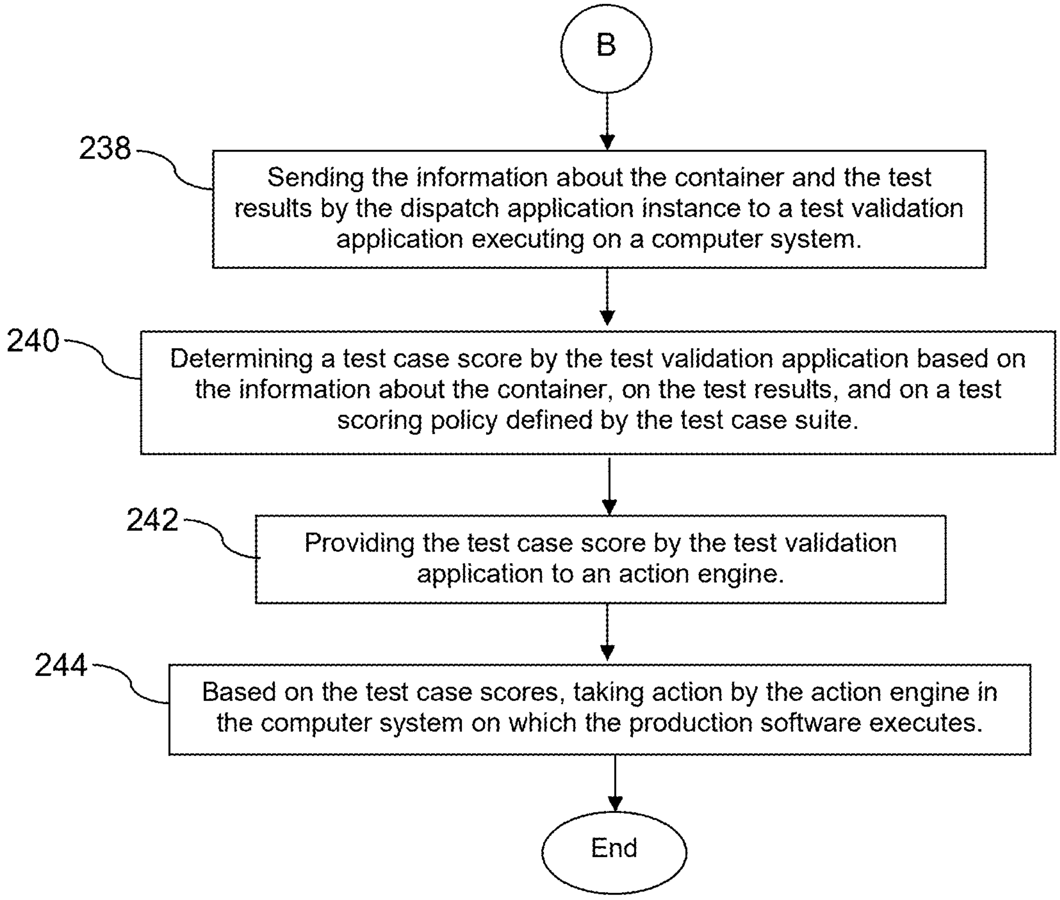

Turning now to FIG. 2A, FIG. 2B, and FIG. 2C, method 200 is described. In an embodiment, the method 200 is a method of testing production software executing on computer systems carrying live telecommunication traffic is described. At block 202, the method 200 comprises receiving a command to run a test suite by a job manager application executing on a computer system, wherein the command comprises an identity of the test suite. In an embodiment, the command to run the test suite is received by the job manager from a test scheduler application that causes the job manager to execute the test suite periodically. In an embodiment, the command to run the test suite provides a custom alarm notification function. In an embodiment, the command to run the test suite is received by the job manager form a web user interface.

At block 204, the method 200 comprises retrieving a test template by the job manager application from a data store based on the identity of the test suite. At block 206, the method 200 comprises identifying a dispatch application instance executing on a computer system by the job manager application, wherein the dispatch application instance is associated with the computer systems on which the production software executes.

At block 208, the method 200 comprises creating a test job by filling out the test template with configuration information by the job manager application based on the computer systems on which the production software executes. At block 210, the method 200 comprises sending the test job to the dispatch application instance by the job manager application.

At block 212, the method 200 comprises receiving a query by the dispatch application instance from a testing application executing on the computer systems on which the production software executes, where the query asks if a test job is pending. At block 214, the method 200 comprises, in response to receiving the query, sending a link to the test job by the dispatch application instance to the testing application.

At block 218, the method 200 comprises sending a request for test instructions by the testing application to a command storage and authorization (CSA) application executing on a computer system, wherein the request for test instructions comprises the link to the test job and a secure signature associated with the testing application. At block 220, the method 200 comprises validating the secure signature by the CSA application. At block 222, the method 200 comprises validating by the CSA application that the testing application is qualified to execute the test job.

At block 224, the method 200 comprises sending executable test instructions by the CSA application to the testing application. At block 226, the method 200 comprises calculating a checksum value by the testing application over the executable test instructions.

At block 228, the method 200 comprises comparing the calculated checksum value by the testing application to a canonical checksum value defined for the executable test instructions. At block 230, the method 200 comprises executing the test instructions by the testing application on the computer system on which the production software executes.

At block 232, the method 200 comprises capturing information about a container associated with the production software. At block 234, the method 200 comprises capturing test results. At block 236, the method 200 comprises sending the information about the container and the test results by the testing application to the dispatch application instance.

At block 238, the method 200 comprises sending the information about the container and the test results by the dispatch application instance to a test validation application executing on a computer system. At block 240, the method 200 comprises determining a test case score by the test validation application based on the information about the container, on the test results, and on a test scoring policy defined by the test case suite. In an embodiment, the test scoring policy is defined in a JavaScript Object Notation (JSON) file format or in another file format. In an embodiment, the test scoring policy is defined in a JavaScript Object Notation (JSON) file.

At block 242, the method 200 comprises providing the test case score by the test validation application to an action engine. At block 244, the method 200 comprises, based on the test case scores, taking action by the action engine in the computer system on which the production software executes. In an embodiment, taking action comprises deleting logs from the computer system on which the production software executes. In an embodiment, taking action comprises performing a restart on at least some of the computer system on which the production software executes and reexecuting the test instructions by the testing application on the computer system on which the production software executes.

Figure 3A:
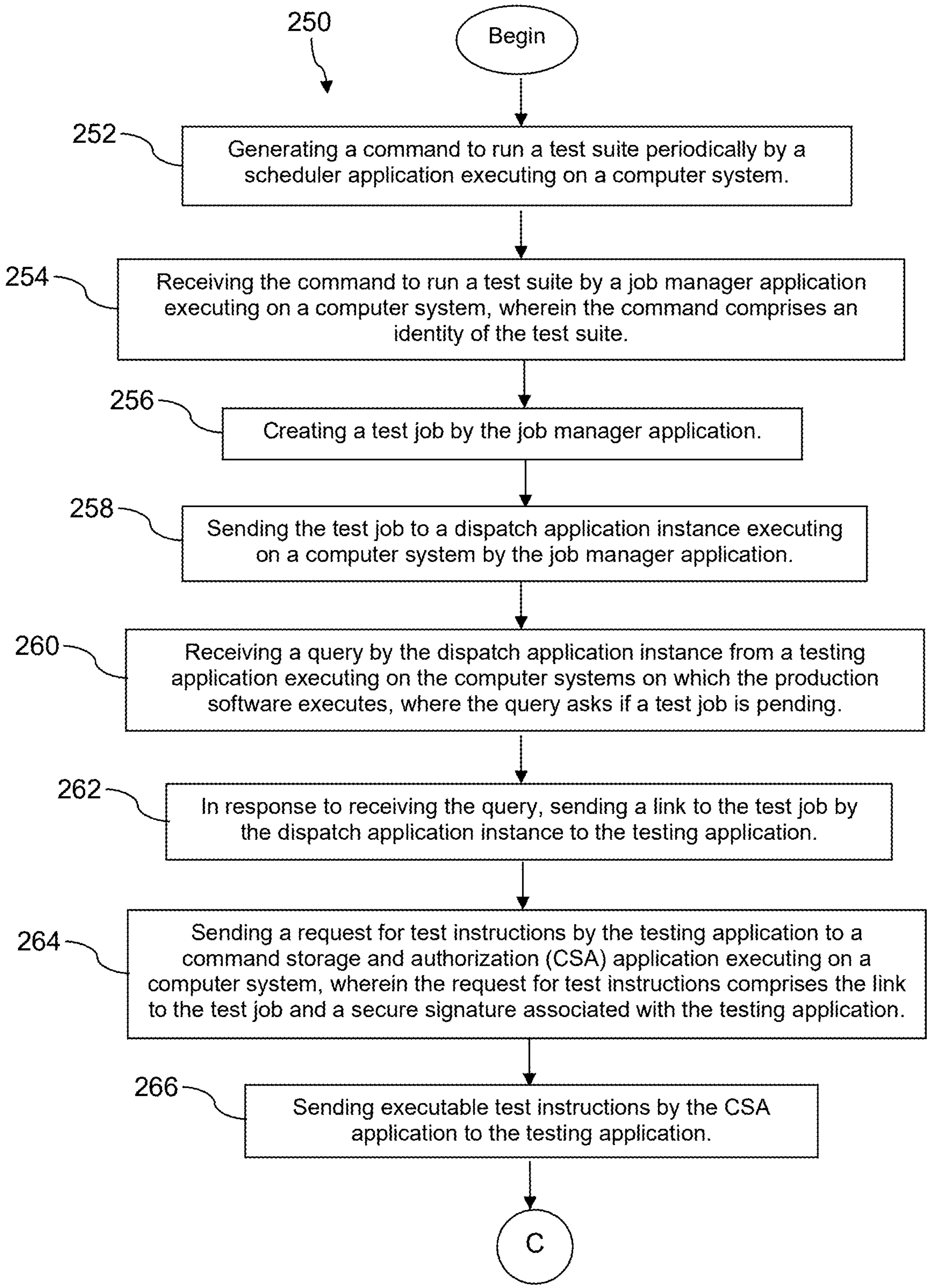
FIG. 3A and FIG. 3B are a flow chart of another method according to an embodiment of the disclosure.
Figure 3B:
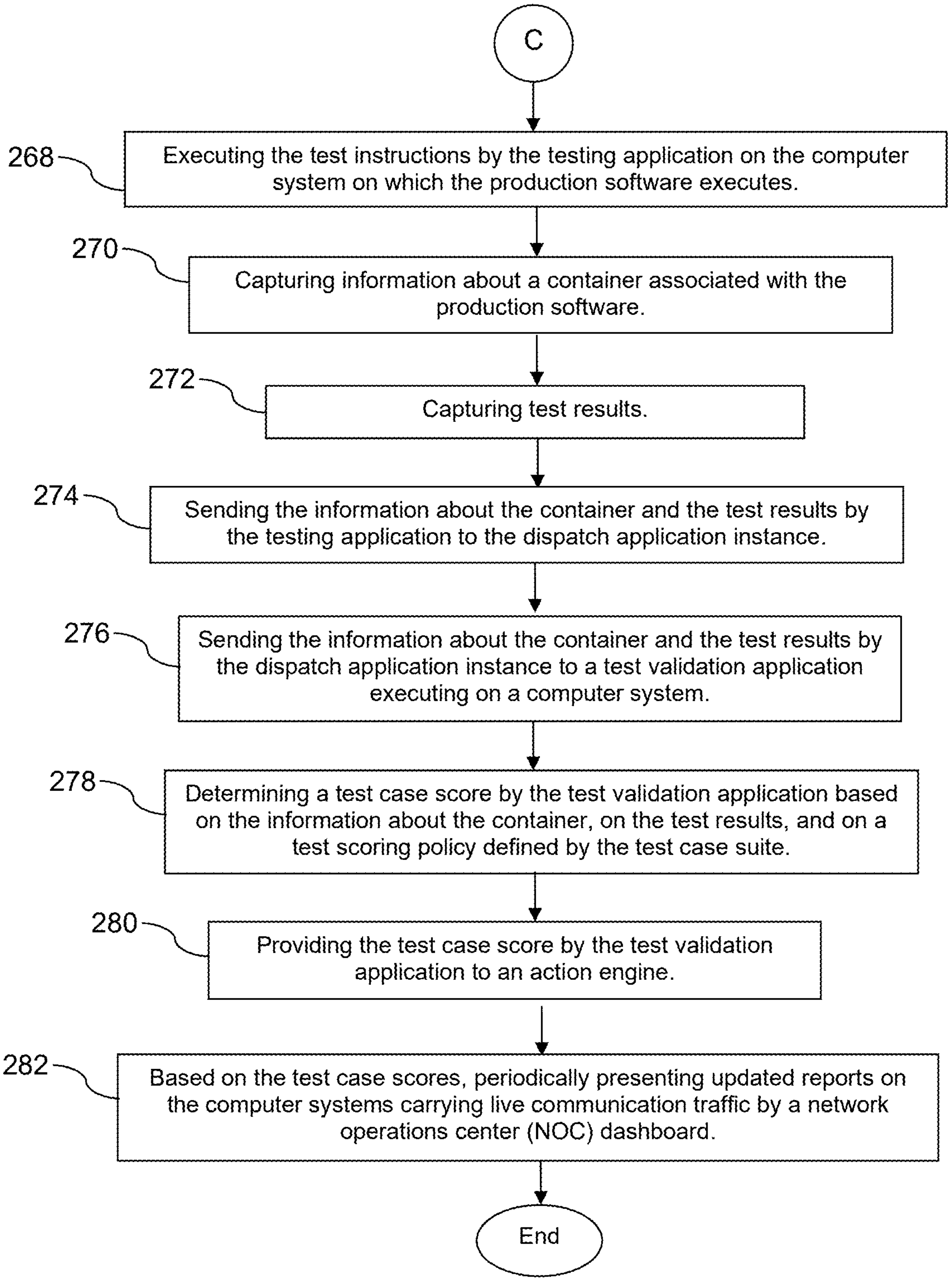

Turning now to FIG. 3A and FIG. 3B, a method 250 is described. In an embodiment, the method 250 is a method of testing production software executing on computer systems carrying live telecommunication traffic. At block 252, the method 250 comprises generating a command to run a test suite periodically by a scheduler application executing on a computer system. In an embodiment, the command to run the test suite periodically provides a custom alarm notification function. In an embodiment, the command to run the test suite periodically defines a five minute periodic interval. In an embodiment, the command to run the test suite periodically defines a ten minute periodic interval.

At block 254, the method 250 comprises receiving the command to run a test suite by a job manager application executing on a computer system, wherein the command comprises an identity of the test suite. At block 256, the method 250 comprises creating a test job by the job manager application.

At block 258, the method 250 comprises sending the test job to a dispatch application instance executing on a computer system by the job manager application. At block 260, the method 250 comprises receiving a query by the dispatch application instance from a testing application executing on the computer systems on which the production software executes, where the query asks if a test job is pending.

At block 262, the method 250 comprises, in response to receiving the query, sending a link to the test job by the dispatch application instance to the testing application. At block 264, the method 250 comprises sending a request for test instructions by the testing application to a command storage and authorization (CSA) application executing on a computer system, wherein the request for test instructions comprises the link to the test job and a secure signature associated with the testing application.

At block 266, the method 250 comprises sending executable test instructions by the CSA application to the testing application. At block 268, the method 250 comprises executing the test instructions by the testing application on the computer system on which the production software executes.

At block 270, the method 250 comprises capturing information about a container associated with the production software. In an embodiment, the information about the container that is captured comprises a memory allocated to the container. In an embodiment, the information about the container that is captured comprises a number of CPUs allocated to the container. At block 272, the method 250 comprises capturing test results. At block 274, the method 250 comprises sending the information about the container and the test results by the testing application to the dispatch application instance.

At block 276, the method 250 comprises sending the information about the container and the test results by the dispatch application instance to a test validation application executing on a computer system. At block 278, the method 250 comprises determining a test case score by the test validation application based on the information about the container, on the test results, and on a test scoring policy defined by the test case suite. In an embodiment, the test scoring policy is defined in a JavaScript Object Notation (JSON) file.

At block 280, the method 250 comprises providing the test case score by the test validation application to an action engine. At block 282, the method 250 comprises, based on the test case scores, periodically presenting updated reports on the computer systems carrying live communication traffic by a network operations center (NOC) dashboard.

Figure 4A:
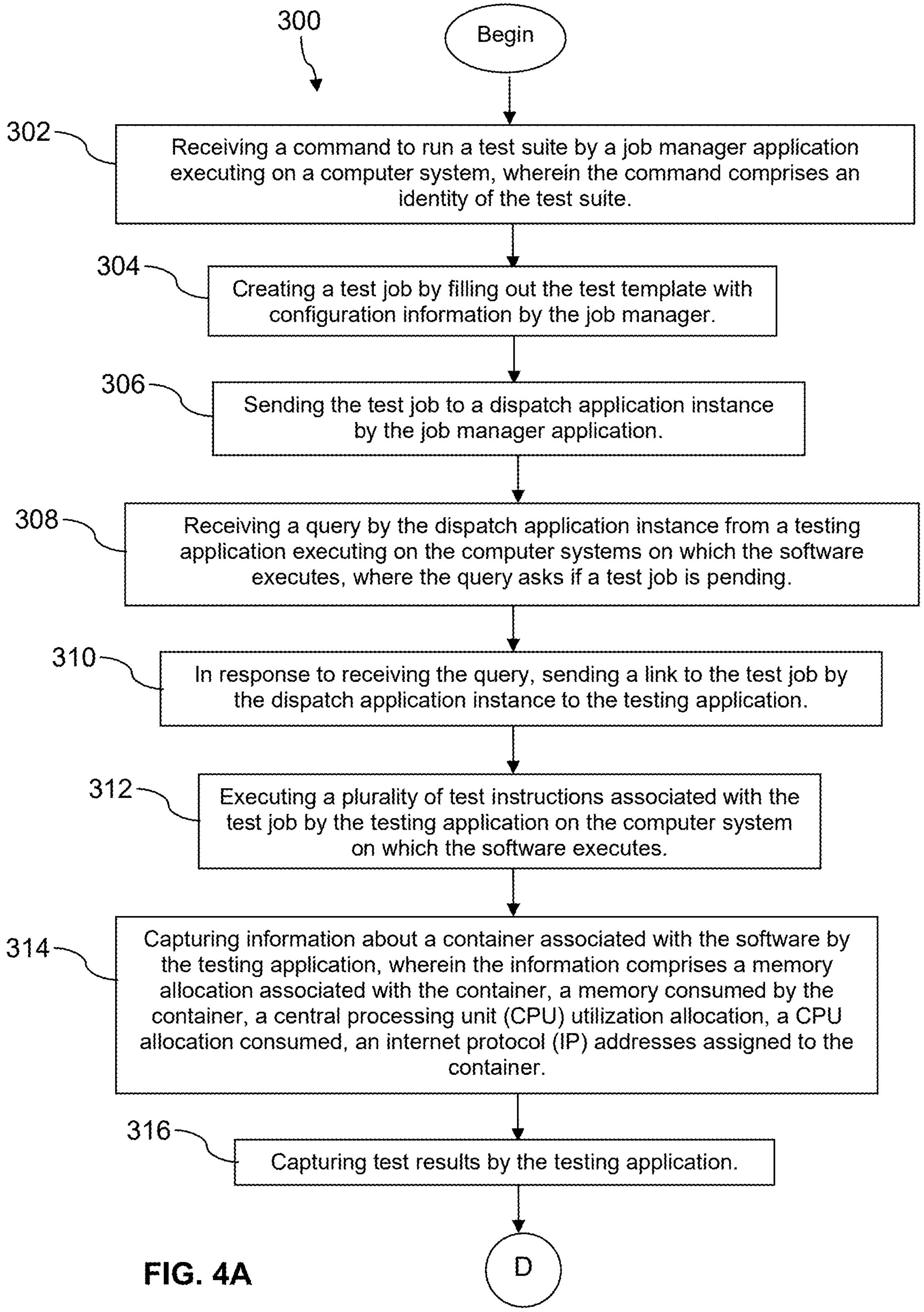
FIG. 4A and FIG. 4B are a flow chart of yet another method according to an embodiment of the disclosure.
Figure 4B:
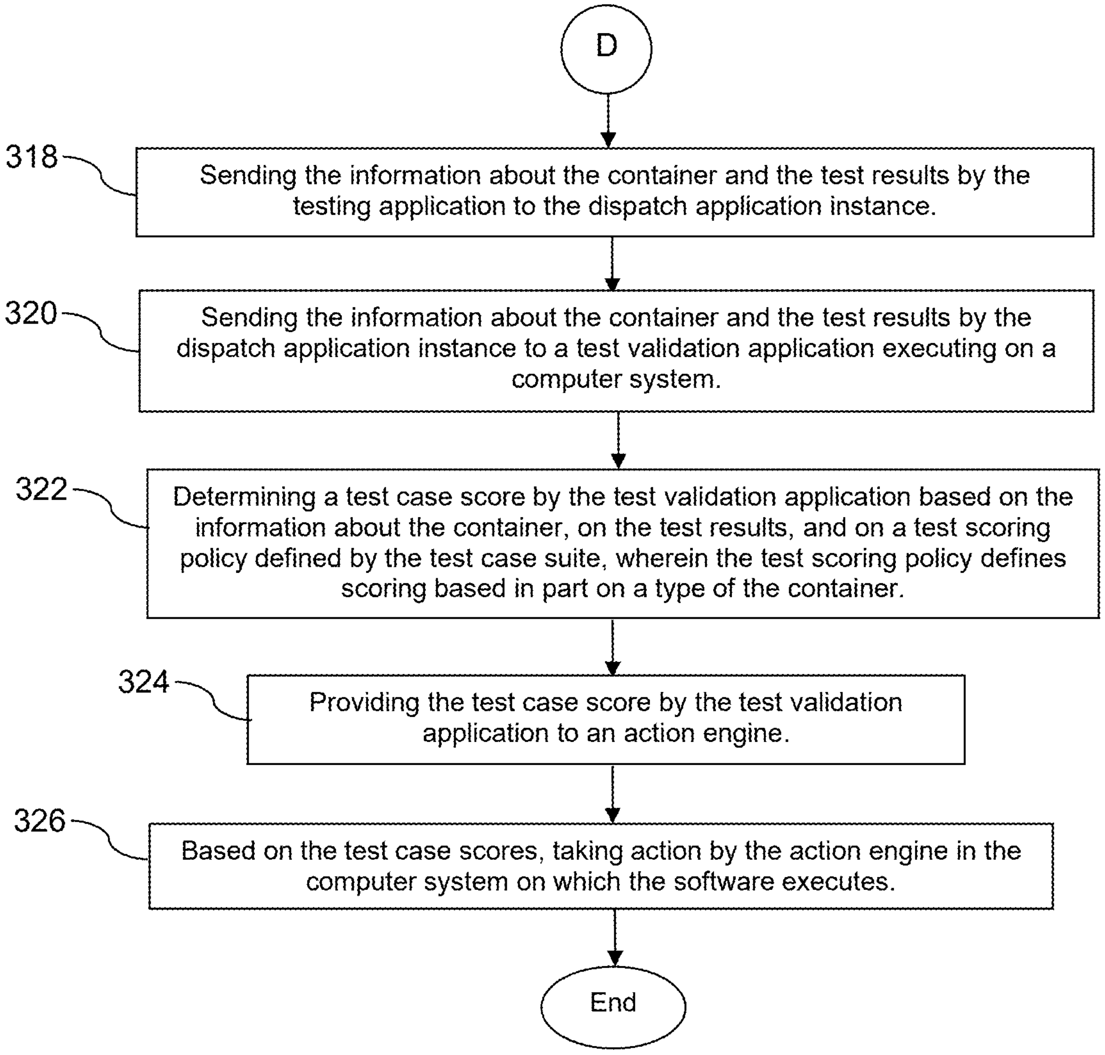

Turning now to FIG. 4A and FIG. 4B, a method 300 is described. In an embodiment, the method 300 is a method of testing software executing on computer systems. In an embodiment, the computer system on which the software being tested executes is a computer system disposed in a testing environment. In an embodiment, the computer system on which the software being tested executes is a production computer system. In an embodiment, the production computing system executes mission critical software or executes telecommunication software processing live traffic. At block 302, the method 300 comprises receiving a command to run a test suite by a job manager application executing on a computer system, wherein the command comprises an identity of the test suite.

At block 304, the method 300 comprises creating a test job by filling out the test template with configuration information by the job manager. At block 306, the method 300 comprises sending the test job to a dispatch application instance by the job manager application.

At block 308, the method 300 comprises receiving a query by the dispatch application instance from a testing application executing on the computer systems on which the software executes, where the query asks if a test job is pending. At block 310, the method 300 comprises, in response to receiving the query, sending a link to the test job by the dispatch application instance to the testing application.

At block 312, the method 300 comprises executing a plurality of test instructions associated with the test job by the testing application on the computer system on which the software executes. At block 314, the method 300 comprises capturing information about a container associated with the software by the testing application, wherein the information comprises a memory allocation associated with the container, a memory consumed by the container, a central processing unit (CPU) utilization allocation, a CPU allocation consumed, an internet protocol (IP) addresses assigned to the container.

At block 316, the method 300 comprises capturing test results by the testing application. At block 318, the method 300 comprises sending the information about the container and the test results by the testing application to the dispatch application instance.

At block 320, the method 300 comprises sending the information about the container and the test results by the dispatch application instance to a test validation application executing on a computer system. At block 322, the method 300 comprises determining a test case score by the test validation application based on the information about the container, on the test results, and on a test scoring policy defined by the test case suite, wherein the test scoring policy defines scoring based in part on a type of the container. In an embodiment, the test scoring policy is defined in a JavaScript Object Notation (JSON) file. In an embodiment, the test scoring policy defines scoring for a call server container type, a packet server container type, a communication session container type, a communication signaling container type, and a virtual load balancing container type.

At block 324, the method 300 comprises providing the test case score by the test validation application to an action engine. At block 326, the method 300 comprises, based on the test case scores, taking action by the action engine in the computer system on which the software executes.

Figure 5A:
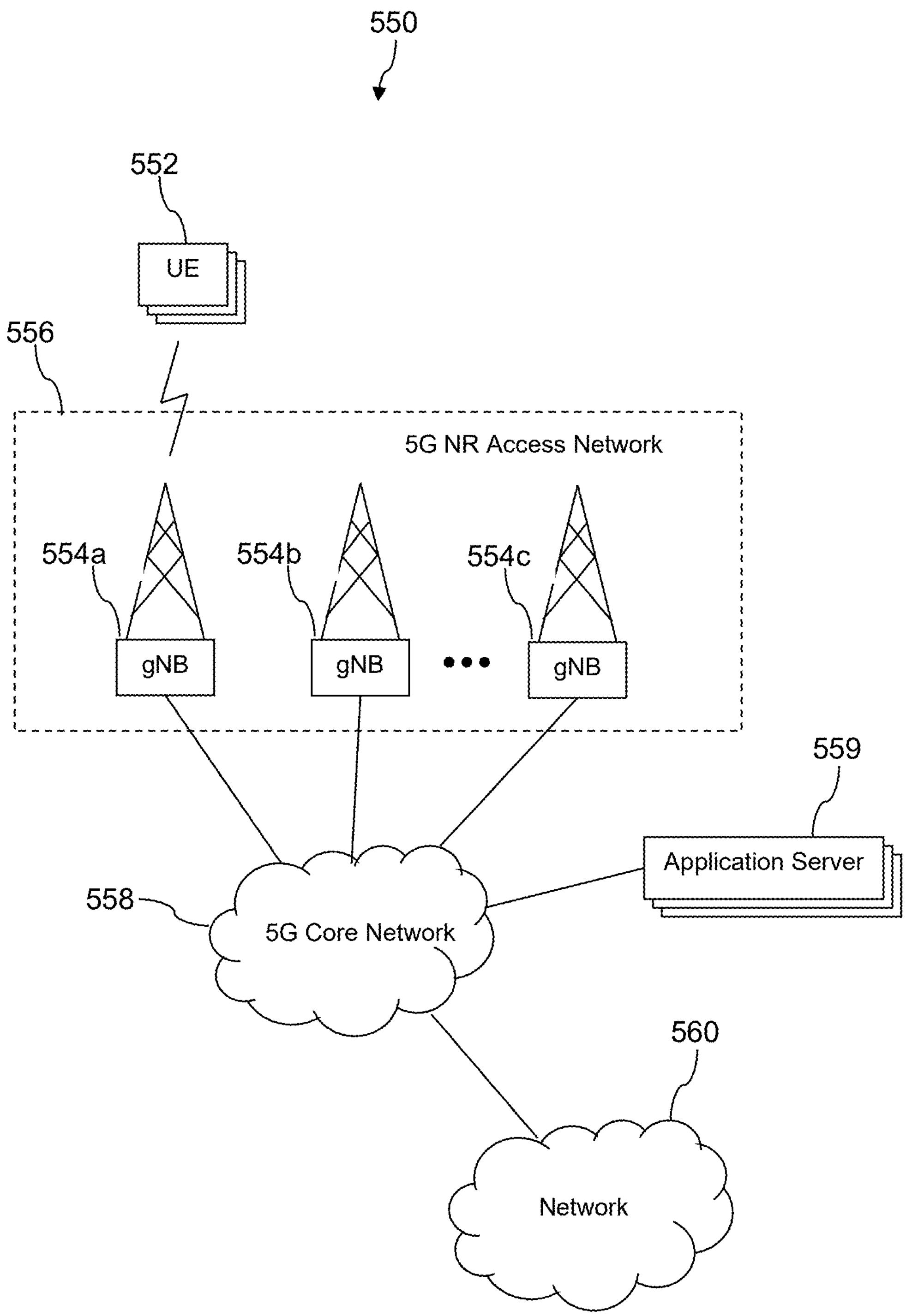
FIG. 5A and FIG. 5B are a block diagram of a telecommunication network according to an embodiment of the disclosure.

Turning now to FIG. 5A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long-term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long-Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
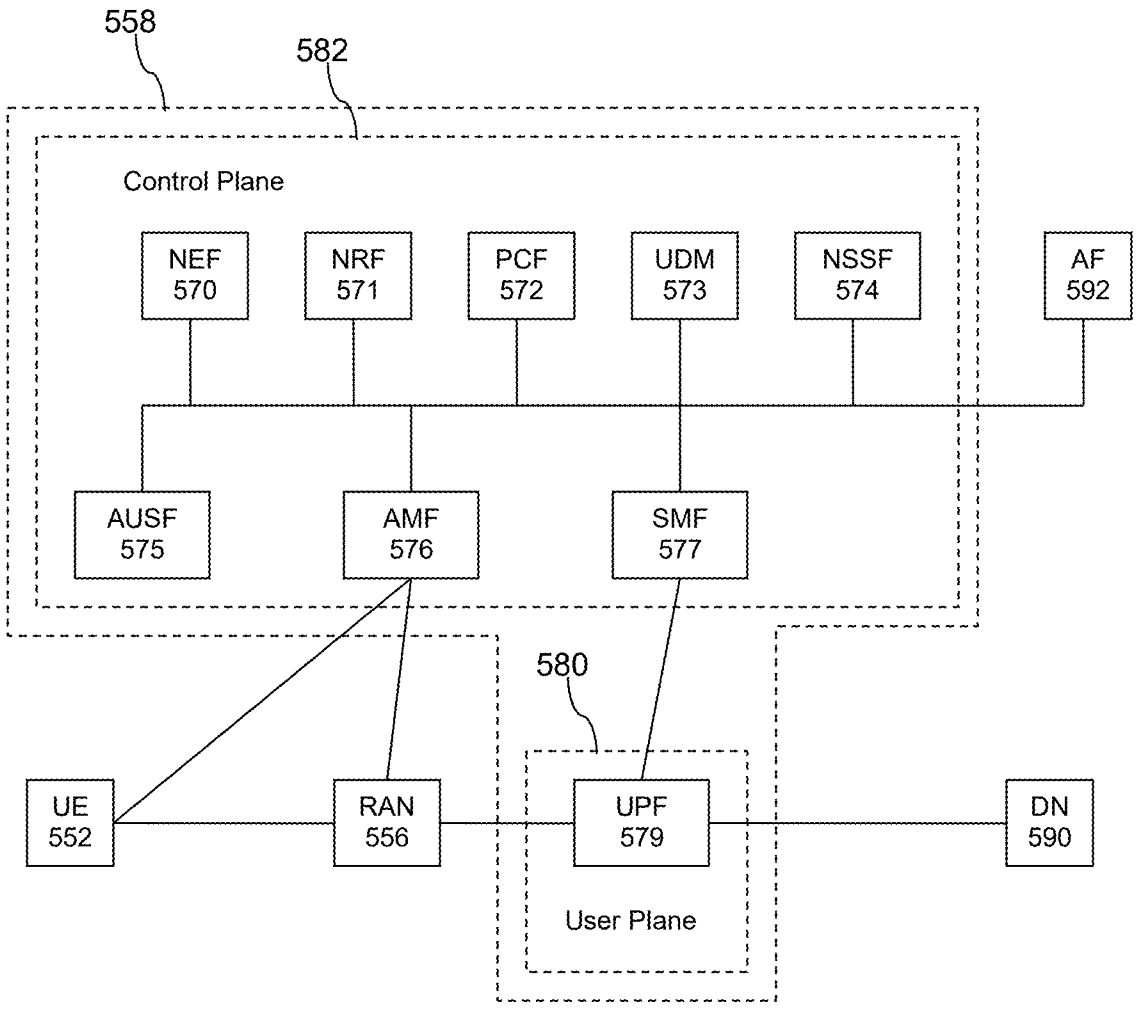

Turning now to FIG. 5B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
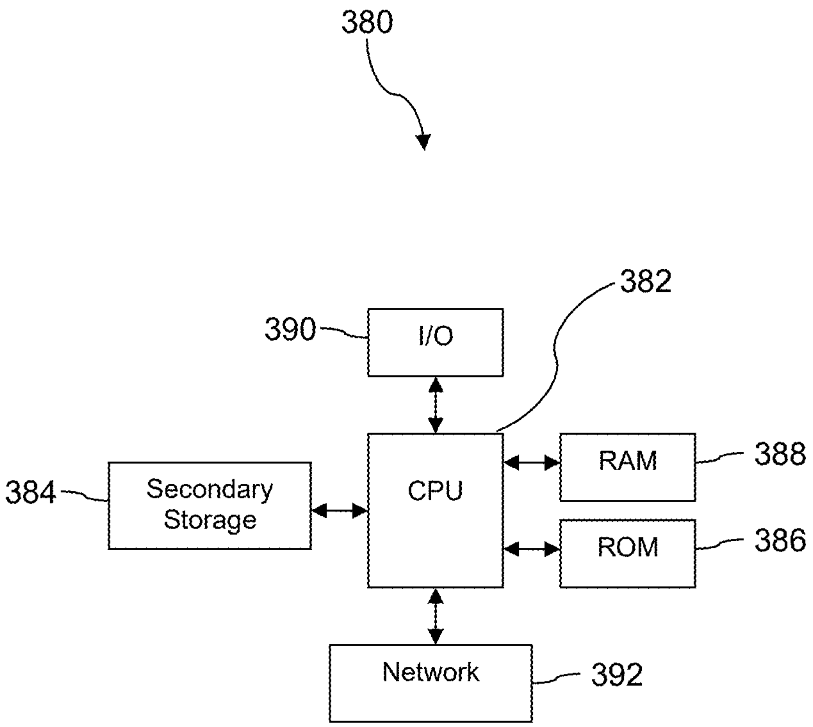
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of testing production software executing on a first computer system carrying live network traffic in a telecommunication network, comprising:

generating a command to run a test suite periodically by a test scheduler application executing on a second computer system;

receiving the command to run the test suite periodically by a job manager application executing on a third computer system, wherein the command to run the test suite comprises an identity of the test suite;

creating a test job by the job manager application;

sending the test job to a dispatch application instance executing on a fourth computer system by the job manager application;

receiving a query by the dispatch application instance from a testing application executing on the first computer system on which the production software executes, wherein the query asks if the test job is pending;

in response to receiving the query, sending a link to the test job by the dispatch application instance to the testing application;

sending a request for a plurality of test instructions by the testing application to a command storage and authorization (CSA) application executing on a fifth computer system, wherein the request for the plurality of test instructions comprises the link to the test job and a secure signature associated with the testing application;

sending the plurality of test instructions by the CSA application to the testing application;

executing the plurality of test instructions by the testing application on the first computer system on which the production software executes;

capturing information about a container associated with the production software;

capturing test results of the execution of the plurality of test instructions by the testing application;

sending the information about the container and the test results of the execution of the plurality of test instructions by the testing application to the dispatch application instance;

sending the information about the container and the test results of the execution of the plurality of test instructions by the dispatch application instance to a test validation application executing on a sixth computer system;

determining a test case score by the test validation application based on the information about the container, on the test results of the execution of the plurality of test instructions, and on a test scoring policy defined by the test suite;

providing the test case score by the test validation application to an action engine executing on a seventh computer system; and based on the test case score, periodically presenting updated reports on the first computer system carrying live traffic in the telecommunication network by a network operations center (NOC) dashboard.

2. The method of claim 1, wherein the command to run the test suite periodically provides a custom alarm notification function.

3. The method of claim 1, wherein the command to run the test suite periodically defines a five minute periodic interval or a ten minute periodic interval.

4. The method of claim 1, wherein the information about the container that is captured comprises at least one of a memory allocated to the container or a number of central processing units (CPUs) allocated to the container.

5. The method of claim 1, wherein the test scoring policy is defined in a JavaScript Object Notation (JSON) file.

6. The method of claim 1, wherein the first, second, third, fourth, fifth, sixth, and seventh computer systems are a same computer system or different computer systems.

7. A method of testing software executing on a first computer system, comprising:

receiving a command to run a test suite by a job manager application executing on a second computer system, wherein the command to run the test suite comprises an identity of the test suite;

creating a test job by filling out a test template with configuration information by the job manager application;

sending the test job to a dispatch application instance executing on a third computer system by the job manager application;

receiving a query by the dispatch application instance from a testing application executing on the first computer system on which the software executes, wherein the query asks if the test job is pending;

in response to receiving the query, sending a link to the test job by the dispatch application instance to the testing application;

executing a plurality of test instructions associated with the test job by the testing application on the first computer system on which the software executes;

capturing information about a container associated with the software by the testing application, wherein the information about the container comprises a memory allocation associated with the container, a memory consumed by the container, a central processing unit (CPU) utilization allocation, a CPU allocation consumed, and an internet protocol (IP) address assigned to the container;

capturing test results of the execution of the plurality of test instructions by the testing application;

sending the information about the container and the test results of the execution of the plurality of test instructions by the testing application to the dispatch application instance;

sending the information about the container and the test results of the execution of the plurality of test instructions by the dispatch application instance to a test validation application executing on a fourth computer system;

determining a test case score by the test validation application based on the information about the container, on the test results of the execution of the plurality of test instructions, and on a test scoring policy defined by the test ease suite, wherein the test scoring policy defines scoring based in part on a type of the container;

providing the test case score by the test validation application to an action engine executing on a fifth computer system; and based on the test case score, taking action by the action engine in the first computer system on which the software executes.

8. The method of claim 7, wherein the test scoring policy is defined in a JavaScript Object Notation (JSON) file.

9. The method of claim 7, wherein the test scoring policy defines scoring for a call server container type, a packet server container type, a communication session container type, a communication signaling container type, and a virtual load balancing container type.

10. The method of claim 7, wherein the first computer system on which the software being tested is a production computer system.

11. The method of claim 10, wherein the production computer system executes mission critical software or executes telecommunication software processing live network traffic.

12. The method of claim 7, wherein the first computer system on which the software being tested is a computer system disposed in a testing environment.

13. The method of claim 7, wherein the first, second, third, fourth, and fifth computer systems are a same computer system or different computer systems.

14. A method of testing production software executing on a first computer system carrying live traffic in a telecommunication network, comprising:

receiving a command to run a test suite by a job manager application executing on a second computer system, wherein the command to run the test suite comprises an identity of the test suite;

retrieving a test template by the job manager application from a data store based on the identity of the test suite;

identifying a dispatch application instance executing on a third computer system by the job manager application, wherein the dispatch application instance is associated with the first computer system on which the production software executes;

creating a test job by filling out the test template with configuration information by the job manager application based on the first computer system on which the production software executes;

sending the test job to the dispatch application instance by the job manager application;

receiving a query by the dispatch application instance from a testing application executing on the first computer system on which the production software executes, wherein the query asks if the test job is pending;

in response to receiving the query, sending a link to the test job by the dispatch application instance to the testing application;

sending a request for a plurality of test instructions by the testing application to a command storage and authorization (CSA) application executing on a fourth computer system, wherein the request for the plurality of test instructions comprises the link to the test job and a secure signature associated with the testing application;

validating the secure signature by the CSA application;

validating by the CSA application that the testing application is qualified to execute the test job;

sending the plurality of test instructions by the CSA application to the testing application;

calculating a checksum value by the testing application over the plurality of test instructions;

comparing the calculated checksum value by the testing application to a canonical checksum value defined for the plurality of test instructions;

executing the plurality of test instructions by the testing application on the first computer system on which the production software executes;

capturing information about a container associated with the production software;

capturing test results of the execution of the plurality of test instructions by the testing application;

sending the information about the container and the test results of the execution of the plurality of test instructions by the testing application to the dispatch application instance;

sending the information about the container and the test results of the execution of the plurality of test instructions by the dispatch application instance to a test validation application executing on a fifth computer system;

determining a test case score by the test validation application based on the information about the container, on the test results of the execution of the plurality of test instructions, and on a test scoring policy defined by the test suite;

providing the test case score by the test validation application to an action engine executing on a sixth computer system; and based on the test case scores, taking action by the action engine in the first computer system on which the production software executes.

15. The method of claim 14, wherein taking action comprises deleting logs from the first computer system on which the production software executes or performing a restart on the first computer system on which the production software executes and re-executing the plurality of test instructions by the testing application on the first computer system on which the production software executes.

16. The method of claim 14, wherein the command to run the test suite is received by the job manager application from a test scheduler application that causes the job manager application to execute the test suite periodically.

17. The method of claim 16, wherein the command to run the test suite provides a custom alarm notification function.

18. The method of claim 14, wherein the command to run the test suite is received by the job manager application from a web user interface.

19. The method of claim 14, wherein the test scoring policy is defined in a JavaScript Object Notation (JSON) file.

20. The method of claim 14, wherein the first, second, third, fourth, fifth, and sixth computer systems are a same computer system or different computer systems.

* * * * *